United States Patent
Rosen

[11] 3,757,336
[45] Sept. 4, 1973

[54] ANTENNA DIRECTION CONTROL SYSTEM
[75] Inventor: Harold A. Rosen, Santa Monica, Calif.
[73] Assignee: Hughes Aircraft Company, Culver City, Calif.
[22] Filed: July 2, 1970
[21] Appl. No.: 51,872

[52] U.S. Cl............ 343/100 ST, 244/1 SS, 332/1, 343/117 R, 343/119
[51] Int. Cl............................................. G01s 3/42
[58] Field of Search.................... 343/113 R, 117 R, 343/119; 332/1; 244/1 SS

[56] References Cited
UNITED STATES PATENTS
3,348,168  10/1967  Melchior et al. ...................... 332/1
3,340,532  9/1967   Glomb et al. ...................... 343/113 R Primary Examiner—Samuel Feinberg
Assistant Examiner—Richard E. Berger
Attorney—James K. Haskell and Richard J. Rengel

[57] ABSTRACT

A satellite communications system comprises signal tracking for a directional antenna by detecting any directional error of the antenna relative to a pilot station, or predetermined offset angle therefrom, to provide phase modulated error signals which are combined with frequency modulated pilot signals radiated by the pilot station in order to pass composite error and pilot signals through a single receive channel including a rotary joint coupler connecting a spinning section and a despun antenna section of a spin-stabilized satellite. Any directional error of the despun antenna about the spin axis of a spinning satellite results in sum and difference signals being produced in the receive feeds of the antenna wherein the magnitude of the difference signal is proportional to the angle of deviation of the antenna pointing direction and the pilot station. The difference signal is phase modulated in an over-coupled, double-tuned, directional filter and combined with the sum signal to produce a composite signal which exhibits amplitude modulation in synchronism with the frequency modulation of the sum signal. The amplitude modulation index is proportional to the difference signal and hence the directional error; and the phase of the amplitude modulation relative to the phase of the frequency modulation indicates the sign of the error. After passing through the rotary coupler, the envelope of the AM signal is detected and compared in a phase detector, with a reference signal derived from the FM of the composite signal. The output of the phase detector is the directional error signal which provides a tracking signal for controlling a despin motor to correct the error in pointing of the antenna.

13 Claims, 4 Drawing Figures

ANTENNA DIRECTION CONTROL SYSTEM

CROSS-REFERENCES TO RELATED APPLICATIONS

The following copending applications have a common assignee:

U.S. patent application Ser. No. 51,423, filed July 1, 1970, of Harold A. Rosen and James S. Ajioka, entitled SHAPED BEAM ANTENNA, now Pat. No. 3,680,143;

U.S. patent application Ser. No. 51,869, filed July 2, 1970, of Harold A. Rosen, entitled DUAL MODE ROTARY MICROWAVE COUPLER, now Pat. No. 3,668,567; and U.S. patent application Ser. No. 657,393, filed July 31, 1967, of C. M. Mears, Jr. et al., now abandoned.

BACKGROUND OF THE INVENTION

In domestic communication satellites for augmenting internal communications of a country, high communication capability can be provided at substantial lower cost by simplifications of the operation of numerous systems and subsystems. For example, reduction in weight of the satellite or communication payload permits the use of smaller boosters for insertion of the satellite into orbit as well as improving the performance and reliability of the system. Improved reliability, in turn, is another benefit which reduces the need for redundancy to further reduce cost and weight. Accordingly, advantages obtained by simplification of various subsystems are not in direct ratio to the cost reduction of the individual subsystem.

In order to obtain optimum communication coverage over a country being served, a beam pattern is provided by the communication antenna and the antenna is aimed to provide this coverage. Antenna direction control becomes increasingly complex as the aiming accuracy and desired lifetime increases. In one of the prior antenna control systems for a spin-stabilized satellite, for example, redundant earth sensors and sun sensors provide the basic sensing elements, and a digital computer derives the steering signals for a despin motor to control orientation of the antenna for efficient communication coverage of a designated area. In addition to the added weight of these sensors and computer in the spacecraft, the prior art antenna direction control system requires precise clocking signals generated by a local clock for the sun sensor. Further, the earth sensors operating in the eclipse mode are subject to noise and the combined sun and earth sensor systems permit antenna direction control errors due to thermal distortion of the antenna, for example.

SUMMARY

In order to overcome the difficulties of sun-earth sensor systems and other prior art on-board systems, the present invention provides for placing a substantial portion of the complex system components and circuitry on the ground at a pilot station. In the spacecraft or satellite, orientation of a directive communication antenna for an efficient communications system is simplified by detecting the angle of arrival of a pilot signal radiated from the pilot station and diplexing of the pilot signals and any directional error detected, for transmission thereof along with other received signals, by a single channel provided between the antenna and receivers for communications and pilot signals. Thus, in spin-stabilized satellites, both received and transmitted communications signals and pilot or command signals can be passed through a single rotary joint coupler between a despun antenna section and a spinning section of the satellite carrying receivers and other equipment. As a result, the simplified communications system not only provides improved performance but also provides greater reliability to reduce the possibility of premature failure of the satellites. Accordingly, an object of the invention is the provision of an improved antenna direction control system having the foregoing features and advantages.

DESCRIPTION OF THE PREFERRED EMBODIMENT

Figure 1:
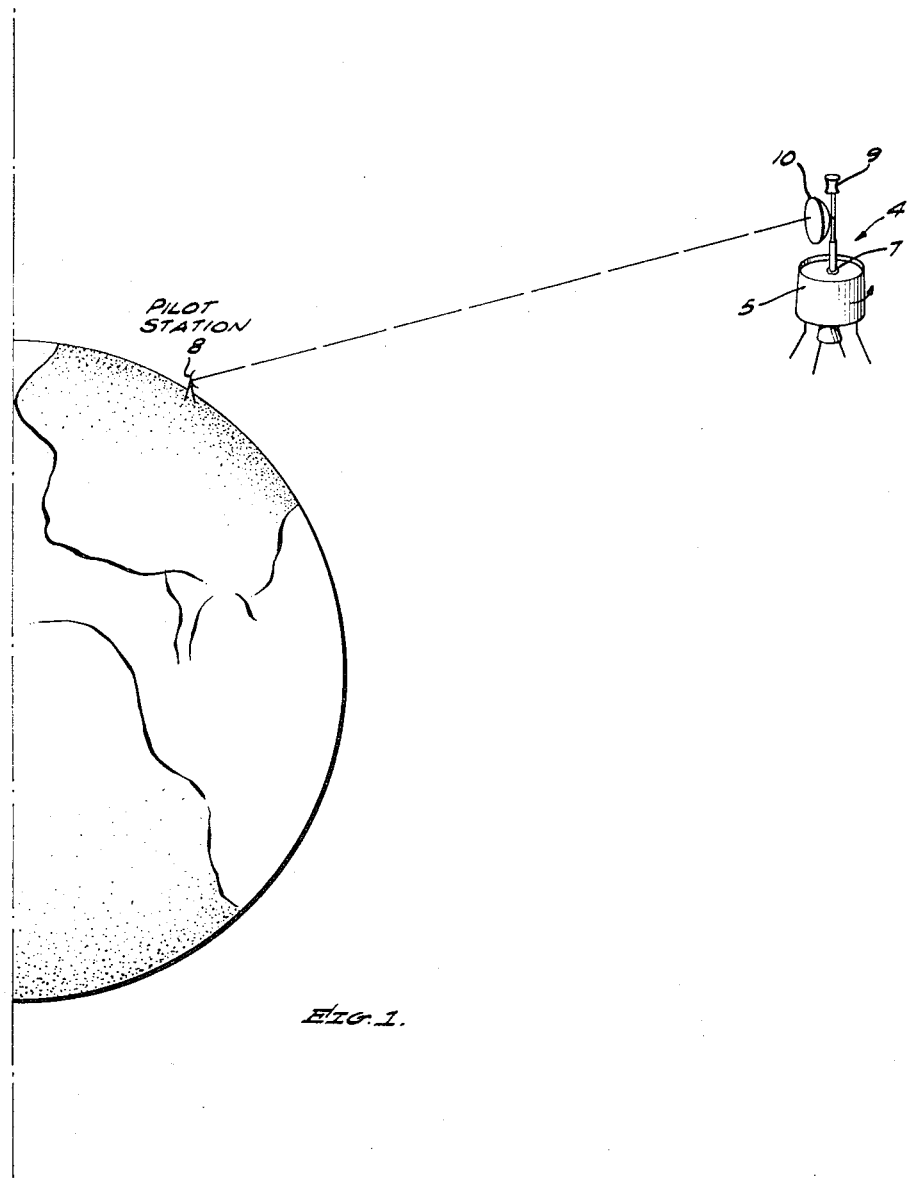
FIG. 1 is a pictorial presentation of a spin-stabilized communications satellite in stationary orbit and having a despun directional antenna pointing toward a pilot station to augment internal communications in an area.

Referring now to FIG. 1, a spin-stabilized 4 is shown in synchronous orbit and having a spin axis parallel to the spin axis of the earth. One or more antennas including a directional antenna 10 are mounted in a despun section of the satellite and coupled to the main spinning section 5 by a rotary joint coupler 7. A suitable despin motor mounted in the satellite 4 and mechanically connected to the antenna 10 by the coupler 7 provides for despinning of the antenna section. Further, in accordance with the direction control system described in detail hereinafter, despinning of the antenna section is controlled so that the directional antenna 10 is pointed toward a pilot station 8 located in the area in which communications are augmented by the satellite communications system including repeaters in the satellite 4. The spinning section 5 of the satellite carries communication, telemetry, command, control, power and apogee motor systems. Since the orbit of the satellite is predetermined, the elevation of the directional antenna 10 is preset although adjustment thereof may be provided by suitable means controlled in response to command signals from the pilot station 8. Accordingly, the direction control system provides for direction control about the spin axis of satellite 4 by controlling the despinning of the antenna section by the despin motor.

Figure 2:
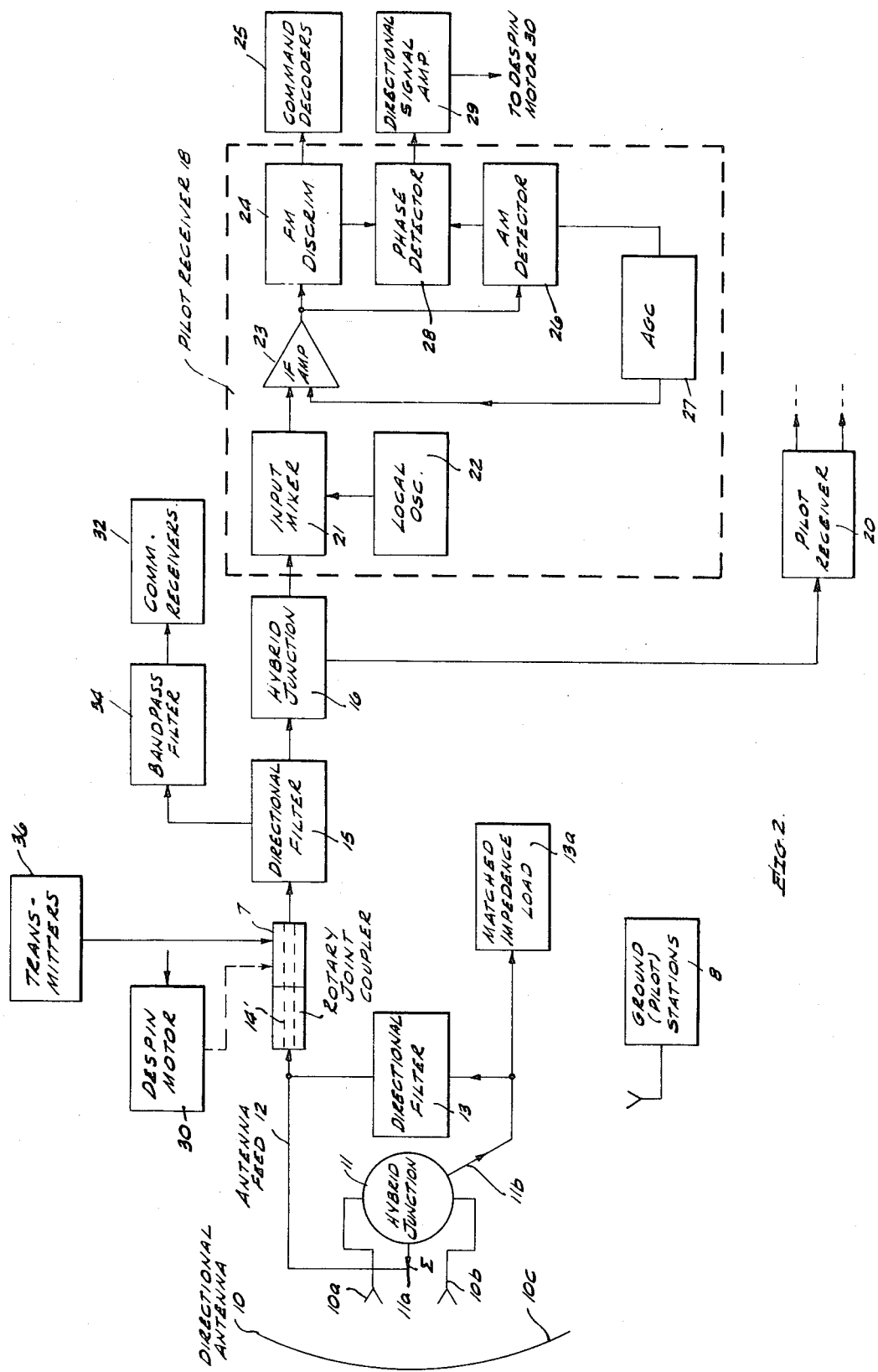
FIG. 2 is a schematic block diagram of a satellite communications system including the improved antenna direction control system according to the preferred embodiment of the invention.

Referring to FIG. 2, the block diagram shows the preferred satellite communications system for satellite 4 to comprise satellite communication equipment for receiving communications and pilot or command signals from ground stations 8 including the pilot station. This system provides for control of the orientation of the despun directional antenna 10 about the spin axis of the satellite for maximum efficiency in transmission of communication signals, operating in dual mode, or by a separate antenna (not shown) for transmitting communication and other signals.

The directional antenna 10 includes feed horns 10a and 10b which are offset from the axis of a single parabolic reflector 10c to supply individual signals to separate inputs of a hybrid junction 11. In response to a frequency modulated pilot signal radiated from the pilot ground station 8, the feed horns 10a and 10b will supply signal inputs to the hybrid junction 11 which vary in relative magnitude (and phase) whenever the directional antenna 10 deviates from the direction of the pilot station 8. During the launch and transfer orbit phase, commands are received from the pilot station by a toroidal beam antenna 9 (FIG. 1) located at the very top of the satellite antenna section. During normal on-station operation, commands are received by the highly directional antenna 10 which also serves for receipt of communication signals from the area on earth being served by the satellite 4. In the receive mode, an antenna feed 12 including directional filter 13 provides for detecting any directional error of antenna 10 about the spin axis of the satellite. The toroidal beam antenna 9 and directional antenna 10 are, preferably, orthogonally polarized in order to reduce the interference between them, and the signals received by the two antennas 9 and 10 are summed by use of a directional filter (not shown), along with communications signals received, and fed through a single coaxial channel provided by a coaxial cable 14' passing axially through the rotary joint coupler 7. On the spinning section side of the rotary joint coupler 7, the pilot signal is separated from the communications signal by a directional filter 15 and introduced into hybrid junction 16 for splitting the power for simultaneously driving pilot receiver 18 and redundant pilot receiver 20.

The pilot receivers 18 and 20 each include an input mixer 21, coupled to a local oscillator 22, which downconverts the pilot signal of microwave frequency to IF for amplification by an IF amplifier 23. The pilot signal, for example, comprises a 6 GHz carrier, frequency modulated between peak-to-peak frequency deviations of 4 MHz by a 10 KHz audio tone which is demodulated by an FM discriminator 24 coupled to the output of the IF amplifier 23. The demodulated audio or pilot tones provided at the output of FM discriminator 24 are coupled to command decoders 25. The command decoders 25 may include tone filters, threshold detectors and a digital register having suitable logic for addressing and executing the required commands.

Considering now details of the directional control system of the system shown in FIG. 2, the frequency modulated pilot signal radiated from the ground pilot station 8 and received by the directional antenna 10 supplies signals of equal magnitude to inputs of hybrid junction 11 whenever the antenna 10 is pointed directly at the pilot station 8. Deviation of the antenna 10 to the right or left of the pilot station results in signals of different magnitude at receive ports of feed horns 10a and 10b and a difference signal $\Delta$ appearing at the difference signal output 11b of the hybrid junction 11. This signal appearing in the difference arm of the hybrid junction is proportional to the magnitude of the angle-error between the pointing direction of antenna 10 about the spin axis of satellite 4 and the direction of the pilot station. The other output 11a of hybrid junction 11 is the sum arm. The signals received from the pilot station 8 by the feed horns 10a and 10b are added in the sum arm to provide a sum signal $\Sigma$. The difference signal $\Delta$ is coupled to the directional filter 13, which is over-coupled and double-tuned to provide periodic phase reversals of the difference signal $\Delta$ at the frequency modulation rate at the output thereof. The phase reversal bandwidth of the directional filter 13 is equal to the peak-to-peak deviation of the frequency modulated pilot signal radiated from the pilot station 8. For example, the peak-to-peak deviation of the pilot signal is 4 MHz and the 180° peak-to-peak phase shift bandwidth of the directional filter is also 4 MHz.

As a result of the double tuning of the directional filter 13, the filter produces a frequency selective delay providing a 180° phase shift across the 4 MHz bandwidth. The directional filter 13 comprises a two cavity resonator capable of providing this 180° phase shift over the 4 MHz peak-to-peak frequency deviations. Accordingly, the higher peak frequency $f_2$ of the difference signal $\Delta$ will be delayed to reverse the phase thereof (180° phase shift) relative to the lower peak frequency deviation $f_1$. Any constant delay will be compensated for by a corresponding delay of the sum signal $\Sigma$ and the difference in delay between peaks $f_1$ and $f_2$ provides a 180° relative phase shift between $f_1$ and $f_2$. As the frequency modulation of the pilot signal varies about the pilot carrier $f_0$ between peak frequency deviations $f_1$ and $f_2$, the difference signal $\Delta$ is phase modulated in passing through the coupling paths of filter 13 to undergo periodic phase reversals at the frequency modulation rate. When this phase modulated signal output of the filter 13 is combined with the sum signal $\Sigma$ in the sum transmission line, the combined or resultant signal exhibits an amplitude modulation in synchronism with the frequency modulation of the pilot signals. The incidental phase modulation is ignored. The combined signal is then fed to the pilot receivers 18 and 20 through the coaxial cable 14' of the rotary joint coupler 7. For a more detailed description of directional filters of the type shown herein, reference is made to the text entitled "Microwave Filters, Impedance-Matching Networks, and Coupling Structures" by G. L. Matthaei et al., published by McGraw-Hill, Inc. and dated 1964 and more particularly Section 14.02 et seq. entitled "Waveguide Directional Filters".

Figure 3A:
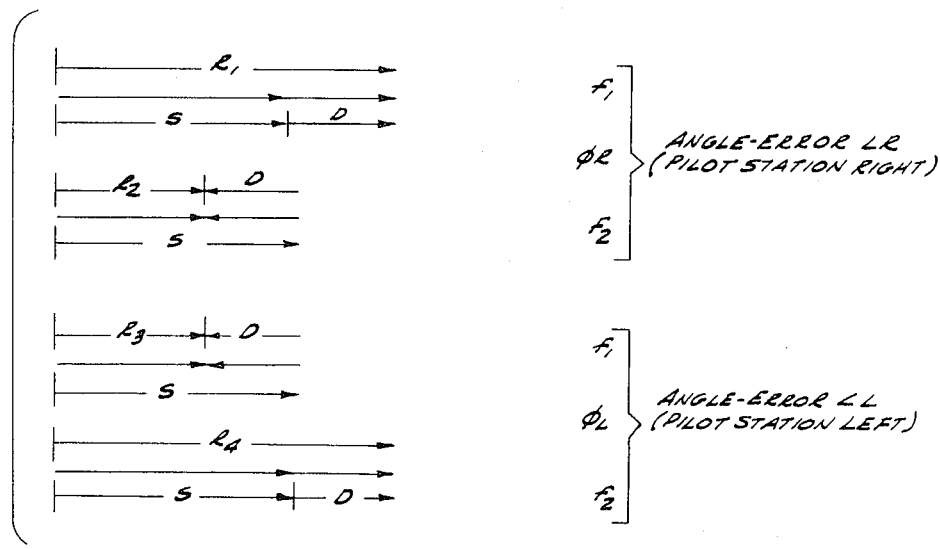
FIG. 3a illustrates vectorially the derivation of typical amplitude modulation of the pilot signal by phase modulation of the difference error signal through frequency selective delay in synchronism with frequency modulations present in the difference error signal and combining sum and difference signals.
Figure 3B:
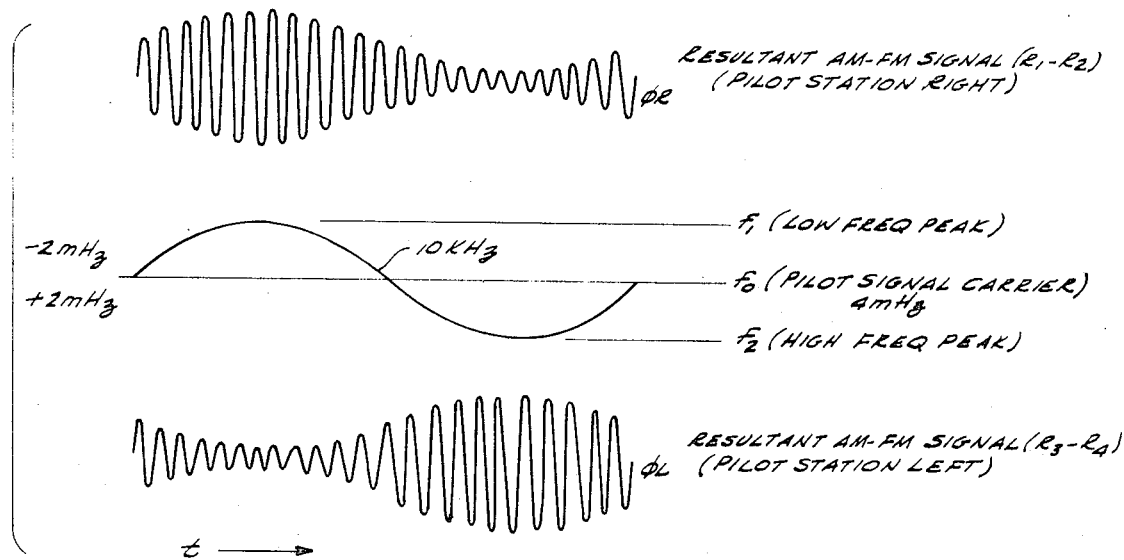
FIG. 3b shows typical waveforms of the combined sum and difference signals exhibiting amplitude modulation of the sum signal illustrated pictorially in FIG. 3b and frequency modulation of the signals.

Referring now to FIG. 2 and diagrams in FIGS. 3a and 3b for a description of the operation of the improved antenna direction control system of the present invention, in pilot signal tracking, the FM pilot signal received from the pilot station 8 by the antenna feed horns 10a and 10b is supplied from receive ports thereof to respective inputs of the hybrid junction 11 wherein the inputs are added in the sum arm of the junction to provide the sum $\Sigma$ thereof at output 11a. Any difference between signal outputs at these receive ports in the pilot FM band is passed through a difference arm of the hybrid junction 11 and supplied from output arm 11b to the input of the directional filter 13 and a matched impedance load 13a in parallel therewith. When the antenna 10 is pointed directly at the pilot station 8, there is zero angle-error and the pilot signals supplied from respective feed horns 10a and 10b are equal. However, an angle-error $\angle R$ (pilot station to the right of the pointing direction of antenna 10) results in a difference signal $\Delta$ of a first phase $\phi R$;

and an angle-error $\angle$ L (pilot station to the left of the pointing direction of antenna 10) results in a reversal in the polarity of the difference signal $\Delta$ to a second phase $\phi$L, i.e. shifted in phase by 180°.

As shown in FIG. 3b, the peak-to-peak deviation $f_1$-$f_2$ of the FM pilot signal corresponds to the 180° peak-to-peak, phase shift bandwidth of the double-tuned, directional filter 13. The difference signal $\Delta$, passed by the filter 13 therefore undergoes periodic phase reversals at the frequency modulation rate, i.e. phase modulated. When the phase modulated difference frequency $\Delta$, at the output of filter 13, is combined with the sum signal $\Sigma$, the resultant or combined signals exhibit an amplitude modulation in synchronism with the frequency modulation, wherein the amplitude modulation index so produced is proportional to the amplitude of the difference signal $\Delta$ and hence, the magnitude of the directional error. The phase of amplitude modulations of the resultant signal, relative to the phase of the frequency modulation, is determined by the polarity $\phi$R, $\phi$L of the difference signal $\Delta$ as indicated by the modulation envelopes of the waveform of the resultant signals in FIG. 3b.

To illustrate the foregoing, a directional angle-error $\angle$ R is first assumed wherein the antenna 10 is pointing to the right of the pilot station 8 which is radiating an FM pilot signal, modulated with a high deviation (e.g. 4 MHz) at an audio rate (e.g. 10 KHz). Antenna horns 10a and 10b, being offset from the center line of the parabolic reflector 10c, supply output signals of different magnitudes to respective inputs of hybrid junction 11 which adds these antenna output signals in its sum arm to provide a sum output signal $\Sigma$ at output 11a; and provide a difference signal $\Delta$ of the first phase $\phi$R at output 11b. As illustrated in FIG. 3a, the lower frequency deviation $f_1$ of the difference signal $\Delta$ ($\phi$R) is passed by directional filter 13 without delay and combined in phase with the sum signal $\Sigma$, adding to the sum signal $\Sigma$, to produce the larger resultant $R_1$. As the frequency varies sinusoidally from $f_1$ to $f_2$ at the 10 KHz frequency modulation rate, as shown in FIG. 3b, the difference signal $\Delta$ appearing at the output of the directional filter 13 undergoes a phase reversal at peak frequency $f_2$. As shown by the vector diagram in FIG. 3a for the higher frequency deviation $f_2$ and angle-error $\angle$R, the difference signal $\Delta$ at the peak frequency $f_2$ subtracts from the sum signal to produce a resultant signal $R_2$. During the period of a complete cycle of frequency modulation of the pilot signal, the combined signal exhibits amplitude modulation in synchronism with the frequency modulation as shown in FIG. 3b (pilot station right). The amplitude modulation index is proportional to the magnitude of the difference signal $\Delta$ (and the directional angle-error $\angle$R) and the phase of the AM, relative to frequency modulation, indicates that the angle-error is to the right of the pilot station 8.

The operation of the foregoing directional feed for an angle-error $\angle$ L in which the antenna 10 is pointing to the left of the pilot station should be evident from the foregoing description for the angle-error $\angle$R. As indicated by the vector diagram of FIG. 3a, the difference signal $\Delta$ for angle-error $\angle$ L is reversed in phase ($\phi$L) whereby the difference signal $\Delta$ of lower frequency peak deviation $f_1$ is 180° out of phase with respect to the frequency modulation of the sum signal and subtracts from the sum signal $\Sigma$ to produce a smaller resultant signal $R_3$ for peak deviation $f_1$. For delayed higher frequency deviation $f_2$ ( $\angle$L), the difference frequency $\Delta$ ($\phi$L) at the peak deviation $f_2$ is shifted in phase 180° to be in-phase with the frequency modulations of the sum signal $\Sigma$ to add thereto and produce a larger resultant signal $R_4$. The combined sum $\Sigma$ and difference signals $\Delta$ ($\phi$L) for angle-error $\angle$ L exhibit amplitude modulations reversed in phase for pilot station to the left of the pointing direction of antenna 10, as evident from a comparison of the envelopes of the signals in FIG. 3b.

In the pilot receiver 18, the combined signal passed thereto is coupled to an AM detector 26 after passing through mixer 21 and amplifier 23. The envelope of the amplitude modulated IF signal is detected by the AM detector 26 and compared in a phase detector 28 with a reference signal supplied from the frequency discriminator 24. The output of the phase detector 28 is proportional in amplitude and related in sign to the directional error of the antenna 10. The signal at the output of the phase detector 28, including its rate, provides the tracking inputs to a directional signal amplifier 29, preferably including a motor power amplifier, whose output is connected to despin motor 30. A despin motor of the type referred to herein, which is responsive to the error signal provided at the output of amplifier 29, is shown and described in the aforementioned copending application Ser. No. 657,393.

The preferred phase detector 28 is of the linear phase detector type which includes a lower pass filter for passing the low frequency or DC component to provide an output voltage proportional to the cosine of the phase difference of the reference and error signal. Thus, the preferred phase detector 28 is distinguished from other phase detectors which produce a voltage proportional to the phase difference. The present phase detector 28 differs from flip-flop phase detectors or sample hold phase detectors in that these latter conventional phase detectors produce a voltage proportional to the phase difference whereas the present linear phase detector utilizes multiplier approach which will produce a voltage proportional to the cosine of the phase difference of reference and detected AM signals.

In general, when operating in the receive mode, the antenna feed 12 including the hybrid junction 11 passes the communication signals along with the combined AM-FM sum signals through a coaxial cable 14' which passes through the center of the rotary joint coupler 7. The communication signals are separated from the pilot signal carrier in a directional filter 15 having an output coupled to the communications receivers 32 through a bandpass filter 34. Transmitters 36 are coupled to antenna 10, or a separate transmitting antenna having the same direction as antenna 10, through the rotary joint coupler 7 by outer waveguides which are described in detail in my aforementioned copending application entitled DUAL MODE ROTARY MICROWAVE COUPLER being filed concurrently herewith. In the coaxial cable 14', 4 GHz chokes on an outer conductor thereof minimize interaction with the transmit signals passed through a surrounding waveguide of the coupler 7.

In the control system for providing directional control of the antenna 10 in order to maintain pointing thereof at the pilot station 8, the preferred directional signal amplifier 29, as noted earlier, includes a motor power amplifier. In further discussion thereof, the despin motor 30 includes a motor bearing assembly which contains a brushless DC motor, known as a resolver commutated motor, two sets of angular contact bearings and a master index pulse generator. A motor of this type is manufactured by Aeroflex Corporation, Long Island, N.Y., and is identified by number TFR 47-5P. The motor power amplifier includes a carrier oscillator and demodulators. The input error signals from the phase detector 28 modulate the carrier which is then resolved in sine and cosine components by a resolver associated with the motor windings. The resolved signals are synchronously demodulated and low frequency outputs are applied to the motor 30 to produce the desired torque. In order to provide an offset in the antenna direction for aiming antenna at locations other than the pilot signal direction, by ground command, an offset pointing capability can be provided by a storage register in combination with a digital-to-analog converter having an output which is summed with the error signal at the input to the motor power amplifier. This offset provided by pointing command can also be used during initial acquisition of communications as the satellite comes into view of the pilot station.

While a preferred embodiment of the invention has been disclosed, it should be clear that the present invention is not limited thereto as many variations will be readily apparent to those skilled in the art. Thus, although it is readily apparent, the preferred embodiment of the invention as described and disclosed is particularly suitable for a satellite communication system; it is also readily apparent that the system of the present invention is usable on the surface of the earth as a signal tracking station having a directional control system for an antenna which provides for detecting a directional error of the antenna relative to remote fixed pilot ground stations or vehicles moving on or immediately above the earth's surface and providing a corresponding radiated signal FM and it is desired to maintain the antenna directed to any one of the ground stations or moving vehicle source of signals. Alternatively, the antenna direction control system of the present invention can be disposed on the moving vehicle or on immediately above the earth's surface for directing the vehicle's antenna toward any ground station providing the source of FM signals. Accordingly, the system of the present invention provides for multiplexing plurality of frequency modulated signals to provide a composite signal exhibiting amplitude modulation as a function of at least one of the frequency modulated signals having a frequency modulation rate for use in signal tracking or other multiplexing systems in communications systems.

What is claimed is:

1. In a communication system, the combination comprising:

a directional antenna for receiving a radiated frequency modulated signal from a signal source, said signal having a period for peak-to-peak frequency deviations, said antenna having antenna feeds responsive to the radiated signal received to produce individual signal outputs including individual signal outputs of different magnitude whenever the pointing direction of the antenna deviates from the direction of said radiated signal;

means coupled to said antenna feeds, said means including a sum arm responsive to individual signal outputs to add said signal outputs to produce a sum signal and a difference arm responsive to individual signal outputs of different magnitudes to produce a difference signal having a magnitude corresponding to the degree of deviation of the pointing direction of said antenna from the direction of said source;

frequency selective delay means having a band-width corresponding approximately to said peak-to-peak frequency deviations of said radiated signal, said delay means being responsive to said difference signal to produce a phase modulated signal having a magnitude corresponding to said degree of deviation of said antenna and periodic phase reversals wherein the period of said phase reversals corresponds to the period for peak-to-peak frequency deviation of the radiated signal; and means for combining said sum signal and phase modulated signal to provide a composite signal exhibiting amplitude modulation including said periodic phase reversals of said phase modulated signals.

2. The combination according to claim 1 which further includes means for detecting the amplitude of said composite signal to provide an antenna directional error signal corresponding in magnitude to the degree of deviation of the pointing direction of the antenna from the direction of said radiated signal.

3. The combination according to claim 1 in which said means coupled to said antenna feeds includes means responsive to a change in pointing direction of the antenna which crosses over the direction of said radiated signal to produce a reversal in polarity of said difference signal and a corresponding reversal in polarity of said amplitude modulation of said composite signal.

4. The combination according to claim 3 which further includes means responsive to said composite signal for producing an error signal having a magnitude proportional to said degree of directional deviation of said antenna and polarity corresponding to the pointing direction of the antenna relative to the direction of the radiated signal.

5. The combination according to claim 4 which further comprises a spin-stabilized vehicle having a predetermined spin axis transverse to the direction of a source of said radiated signal including a spinning section, a despun section, and means including a rotary joint coupler and a despin motor for controlling the pointing of said directional antenna disposed on said despun section about said spin axis, said despin motor being responsive to said error signal to maintain the pointing direction of the antenna about the spin axis toward the source of said radiated signal.

6. The combination according to claim 5 in which said directional antenna comprises antenna feed means including two feed horns and a single parabolic reflector, and said feed horns are offset from the axis of said reflector to provide receive signal outputs of different magnitudes whenever the pointing direction of the antenna is different from the direction of said source of radiated signals and the magnitude of the difference of said receive signal outputs is proportional to the angle between the pointing direction and the direction of the source of radiated signals.

7. The combination according to claim 6 in which said feed horns are disposed to produce difference signals of opposite polarity corresponding to the antenna pointing directions on either side of said source of radiated signal.

8. A system for multiplexing a plurality of frequency modulated signals to provide a composite signal exhibiting amplitude modulation as a function of magnitude of at least one of the frequency modulated signals having a frequency modulation rate comprising:

frequency selective delay means capable of producing phase reversals between peak frequency deviations of frequency modulation and responsive to at least one of said plurality of frequency modulated signals capable of varying in magnitude, to phase modulate said latter signal including periodic phase reversals at the frequency modulated rate;

combining means responsive to said phase modulated signal and another of said plurality of frequency modulated signals to produce a composite signal exhibiting amplitude modulation wherein the index of amplitude modulation is a function of the magnitude of said frequency modulated signal capable of varying in magnitude; and one of said plurality of frequency modulated signals and said another of said plurality of frequency modulated signals have the same modulation rate to provide periodic phase reversals of the amplitude modulation of said composite signal.

9. A system for multiplexing a plurality of frequency modulated signals to provide a composite signal exhibiting amplitude modulation as a function of magnitude of at least one of the frequency modulated signals having a frequency modulation rate comprising:

frequency selective delay means capable of producing phase reversals between peak frequency deviations of frequency modulation and responsive to at least one of said plurality of frequency modulated signals capable of varying in magnitude, to phase modulate said latter signal including periodic phase reversals at the frequency modulated rate;

combining means responsive to said phase modulated signal and another of said plurality of frequency modulated signals to produce a composite signal exhibiting amplitude modulation wherein the index of amplitude modulation is a function of the magnitude of said frequency modulated signal capable of varying in magnitude; and said plurality of frequency modulated signals are signals of microwave frequency and said frequency selective delay means comprises a microwave directional filter, double-tuned to said peak frequency deviations.

10. A system for multiplexing a plurality of frequency modulated signals to provide a composite signal exhibiting amplitude modulation as a function of magnitude of at least one of the frequency modulated signals having a frequency modulation rate comprising:

frequency selective delay means capable of producing phase reversals between peak frequency deviations of frequency modulation and responsive to at least one of said plurality of frequency modulated signals capable of varying in magnitude, to phase modulate said latter signal including periodic phase reversals at the frequency modulated rate;

combining means responsive to said phase modulated signal and another of said plurality of frequency modulated signals to produce a composite signal exhibiting amplitude modulation wherein the index of amplitude modulation is a function of the magnitude of said frequency modulated signal capable of varying in magnitude; and said one of said frequency modulated signals comprises a difference signal and said another of said plurality of frequency modulated signals comprises a sum signal, and said system further includes means for deriving sum and difference signals from individual frequency modulated signals having the same frequency modulation rate.

11. The system according to claim 10 which further includes directional antenna means including feed means responsive to a radiated frequency modulated signal for producing separate frequency modulated signal outputs including signal outputs of different magnitude whenever the pointing direction of said directional antenna means is different from the direction of said radiated signal.

12. The system according to claim 10 in which the source of said radiated signal is the desired pointing direction of said antenna means and said means for deriving sum and difference signals is responsive to deviations in the direction of the antenna to opposite sides of said source to produce a phase reversal of said difference signal and amplitude modulation of said composite signal.

13. A control system for aiming a directional antenna, disposed on a despun section of a spin-stabilized vehicle, toward a pilot station source of radiated frequency modulated signals comprising:

a directional antenna including feed means responsive to an angle of directional error of said antenna relative to the direction of said pilot station to produce individual signals of different magnitude wherein the difference in magnitude corresponds to the magnitude of the error angle;

means responsive to said individual signals for producing sum and difference signals including a difference signal having a magnitude proportional to the error angle and polarity corresponding to the direction of aiming of the antenna relative to the pilot station;

means for phase modulating said difference signal to produce periodic phase reversals of said difference signal at the frequency modulation rate of said pilot signals;

combining means for combining the sum and phase modulated difference signals to produce a composite signal exhibiting amplitude modulation in synchornism with the frequency modulation of the pilot signal wherein the index of amplitude modulation is proportional to the magnitude of the difference signal and the phase of the composite signal is determined by the polarity of the difference signal;

rotary coupling means including a coaxial cable for coupling said composite signal from the combining means disposed on the despun section to the spinning section of said vehicle, means disposed on said despun section and coupled to said rotary coupling means for detecting the index of amplitude modulation and phase of said amplitude modulation relative to said frequency modulation to produce an error signal having a magnitude proportion to the error angle; and means including a despin motor responsive to said error signal to control the despinning of said despun section to maintain said antenna aimed toward said pilot station.

* * * * *